Patented Mar. 17, 1942

2,276,932

UNITED STATES PATENT OFFICE 2,276,932

TREATMENT OF RUBBER

Clyde Coleman, Montclair, N. J., assignor to United States Rubber Company, New York, N. Y., a corporation of New Jersey No Drawing. Application March 28, 1939,
Serial No. 264,595

6 Claims. (Cl. 260—800)

This invention relates to the treatment of rubber and similar oxidizable materials, and more particularly to a new class of age resistors.

An object of the invention is to provide a new class of anti-oxidants or age resistors for organic substances which tend to deteriorate by absorption of oxygen from the air, for example, goods of rubber or allied gums, unsaturated fatty oils such as unsaturated vegetable oils, essential oils, petroleum oils and their derivatives such as gasolines, soaps, aldehydes, synthetic resins, turpentine, paints and varnishes containing drying oils, and the like. A further object of the invention is to provide chemicals which additionally act as flex-improvers or anti-flex cracking agents for vulcanized rubber such as tire treads, which undergo repeated strains during use. Further objects will be apparent from the following description.

According to the invention rubber and the like as aforesaid is treated with a compound having the general formula A—X where X is the ring nitrogen atom of a 2,5-dialkyl pyrrol group, and A is an aliphatic group containing at least one carbon atom and preferably two or more open-chain carbon atoms. The aliphatic group A may have as a substituent a hydroxyl group, and the chemicals accordingly include N-alkyl 2,5-dialkyl pyrrols and N-alkylol 2,5-dialkyl pyrrols.

The aliphatic radical A may be a branched-chain radical, or a straight chain radical, and the hydroxyl group may be situated at any point on the chain. Accordingly A may be, for example, methyl, ethyl, propyl, isopropyl, butyl, isobutyl, sec-butyl, tert-butyl, amyl, etc., or a corresponding alkylol radical.

The following are illustrative of the chemicals included in the invention:

I. N-n-butyl-2,5-dimethyl-pyrrol

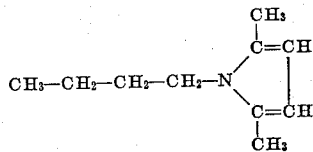

II. N-beta-propylol-2,5-dimethyl-pyrrol

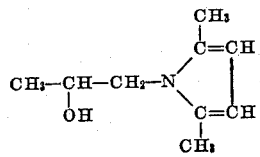

As further examples, when A is any of the above aliphatic groups, X may be:

(1) 2,5-dimethyl pyrrolonyl
(2) 2,5-dimethyl pyrrolidinyl

These compounds may be made in several ways, as for instance, by treating an alkyl halide, or in case the aliphatic radical is to contain a hydroxyl group, an alkyl halo-hydrin, with the proper heterocyclic secondary amine, in the presence of an inorganic base. According to another type of reaction, N-ethylol-2,5-dimethyl pyrrol is made by condensing ethanol-amine with acetonyl-acetone.

In the table below are given data showing the effectiveness of certain of these chemicals in preventing the cracking of bent rubber vulcanizates exposed to the sun.

A tread stock containing smoked sheet, carbon black, softeners, antioxidant, sulfur, zinc oxide and accelerator was prepared and divided into three portions. To one part was added an amount of N-n-propyl-2,5-dimethyl-pyrrol equal to 1% on the rubber, and to another portion a like amount of beta-propylol-2,5-dimethyl-pyrrol. The same amounts of the same chemicals were also added to portions of a gum stock containing only rubber, sulfur, zinc oxide, stearic acid and accelerator. After vulcanization the stocks were tested for resistance to cracking by cutting pieces of convenient size and bending them into loops which were fastened to a board. They were then exposed to the sun in Florida. The results are shown below. The symbols in the table have the following meanings:

|  | 7 days' exposure | | 34 days' exposure | | 67 days' exposure | |
|---|---|---|---|---|---|---|
|  | Tread | Gum | Tread | Gum | Tread | Gum |
| N-beta-propylol-2, 5-di-methyl pyrrol | ++ | +++ | 0 | +++ | 0 | +++ |
| N-n-propyl (2-5 di-methyl pyrrol) | ++ | +++ | 0 | +++ | 0 | +++ |

+ + + No cracking.
+ + Very slight cracking.
0 Same as control.

The controls which contained no added chemical corresponding to those subject of the present invention were badly cracked even after only one day of exposure in the test.

The invention may be applied to the preservation of natural as well as artificially-prepared rubber compositions, cured or uncured, including reclaims and latices of such compositions.

It is also to be understood that other desired filling and compounding ingredients may be incorporated along with the preservative, for example, in the case of rubber, there may be incorporated other accelerators, softeners, etc.

The age resistor may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the anti-oxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastication, and prepared for incorporation into dispersions or solutions either in powder, paste or solution form, or applied in such forms for incorporation by diffusion, to the surfaces of vulcanized or unvulcanized rubber goods.

Having thus described my invention, what I claim and desire to protect by Letters Patent is:

1. A process of inhibiting the deterioration of organic substances which tend to deteriorate by absorption of oxygen from the air which comprises treating the same with a compound having the general formula A—X where X is the ring nitrogen atom of a 2,5-dialkyl pyrrol group, and A is an aliphatic group containing a plurality of open-chain carbon atoms, with one carbon atom directly attached to said ring nitrogen atom.

2. A process of inhibiting the deterioration of organic substances which tend to deteriorate by absorption of oxygen from the air which comprises treating the same with an N-alkyl-2,5-dialkyl pyrrol.

3. A process of inhibiting the deterioration of organic substances which tend to deteriorate by absorption of oxygen from the air which comprises treating the same with N-beta-propylol-2,5-dialkyl pyrrol.

4. A process of inhibiting the deterioration of organic substances which tend to deteriorate by absorption of oxygen from the air which comprises treating the same with an N-n-propyl-(2,5-dialkyl pyrrol).

5. An organic substance which tends to deteriorate by absorption of oxygen from the air containing a compound having the general formula A—X where X is the ring nitrogen atom of a 2,5-dialkyl pyrrol group, and A is an aliphatic group containing a plurality of open-chain carbon atoms, one carbon atom of which is directly attached to said ring nitrogen atom.

6. A rubber product containing an anti-oxidant having the general formula A—X where X is the ring nitrogen atom of a 2,5-dialkyl pyrrol group, and A is an aliphatic group containing a plurality of open-chain carbon atoms, a carbon atom of which is directly attached to said ring nitrogen atom.

CLYDE COLEMAN.